May 6, 1941.   J. A. BYERS   2,240,979
VALVE
Filed March 11, 1938
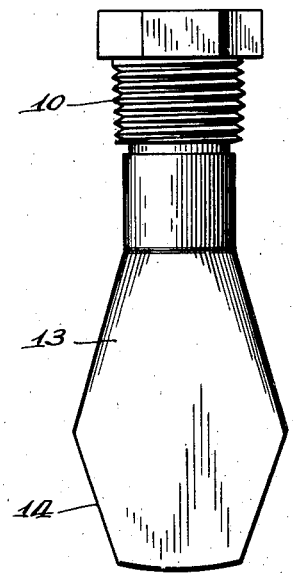
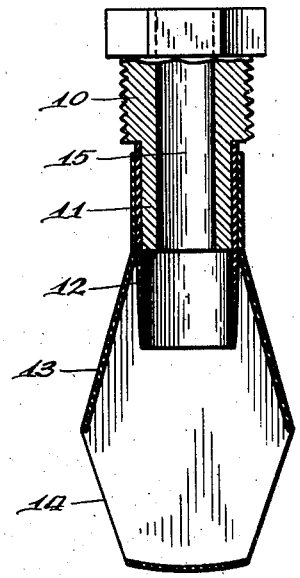
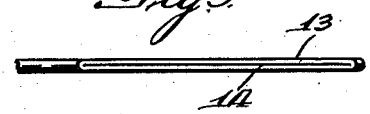
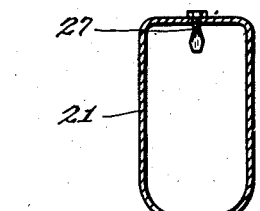
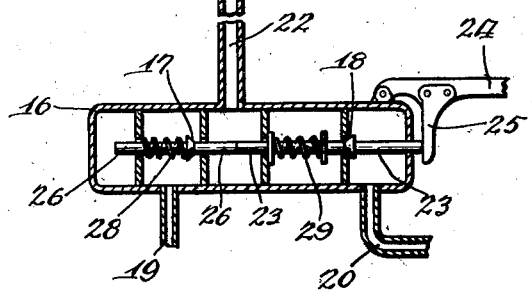
Inventor
John A. Byers.
By Ambs, Thiess, Olea & Mecklenburger
Attys.

Patented May 6, 1941

2,240,979

UNITED STATES PATENT OFFICE 2,240,979

VALVE

John A. Byers, Chicago, Ill., assignor to James B. Clow & Sons, Chicago, Ill., a corporation of Illinois Application March 11, 1938, Serial No. 195,241

1 Claim. (Cl. 251—122)

This invention relates to a valve and more specifically to what, for the sake of convenience, has been designated in the art as a flutter valve.

It has for one object the provision of a valve that will be sensitive to slight pressure changes within the system in which it is used but, at the same time, will include such structure and possess sufficient strength to hold against high pressures; in short, a valve which will be so novelly formed that these wholly inconsistent and heretofore unreconcilable requirements will both be satisfactorily met.

The invention relates also to a system embodying such a valve which has not been heretofore satisfactorily operable because there has been no valve capable of operation under the excessively varying pressure conditions encountered in such systems.

Flutter valves have been used for a variety of purposes in the past, the most important of these probably being their use on respirators, gas masks, and the like, wherein it is desirable to allow a fluid to pass in only one direction through any given orifice. Such valves as heretofore employed have consisted of a flat bag of soft pliable rubber or other resilient material connected at one end with a suitable fitting. The other end of the bag is provided with slits, the walls of the bag being arranged, when the valve is in collapsed condition, to lie directly one upon the other. Thus it is possible, when pressure is exerted in one direction upon the valve, for fluid to pass through the fitting and out of the slits in the rubber bag. However, when the pressure is reversed, the arrangement of the walls forces the walls of the bag tightly together and prevents the fluid from passing in a reverse direction through the valve.

This type of valve has been acceptable only where small pressure differentials have been encountered, since with such differentials the valve is readily opened by fluid passing through in one direction and correspondingly readily closed when the pressure is exerted in the other direction. The valve as used in the past, however, has certain outstanding disadvantages which have sharply limited its application. Such limitations are particularly noticeable where it is necessary to employ a valve that is sensitive to slight pressure changes but which is also periodically subjected to high pressures when the valve is closed. If high pressure is exerted on the now known type of valve, the rubber bag collapses tightly around the fitting to which it is attached, which is usually made of metal or other hard, non-resilient material. This causes the valve in some cases to jam; i. e., the high pressure may push the rubber into the fitting with the result that the operation is thereafter unpredictable. Eventually, moreover, such action causes the resilient material of the bag to become worn, after which the valve may develop leaks and must be replaced.

One might suggest making the bag of heavier material as a remedy for the last-described shortcoming, but this, of course, would militate against correct operation under low pressure differentials. Accordingly, the requirements seemed unreconcilable until the present discovery.

A valve is subjected to these widely varying pressure conditions, for instance, when used in the pressure tank of an automatically operated toilet as will be hereinafter described. Accordingly, a further object of this invention is the provision of a flutter valve that is sensitive to low pressure changes and useful as a siphon breaker for a pressure tank in an automatically operating toilet.

Figure 1 is an elevational view of a preferred form of this invention;

Fig. 2 is a sectional elevational view of the structure shown in Fig. 1;

Fig. 3 is a fragmentary side view showing one of the slits in the bag; and

Fig. 4 is a diagrammatic representation, largely in section, of an automatically-operated toilet system employing the valve of this invention.

The valve of this invention comprises a flattened bag of rubber or other resilient material which has slits or holes at one end, a suitable fitting engaged with the opposite end of said rubber bag, and a novel reinforcing means of rubber or other resilient material associated between said fitting and said rubber bag in such manner as to eventuate a desirable and heretofore unknown structure.

Referring now to Figs. 1 and 2, a fitting 10, which may be constructed of metal or any other suitable material and is provided with threads to permit association with a tank, is connected at one end 11 with a cylindrical piece of resilient tubing 12. This tubing 12—attached to the end 11 of fitting 10—is made of rubber, leather, or any other like material, and extends beyond the lower end of the fitting 10 for a substantial distance. The tubing 12 also preferably has tapered edges opposite the end attached to fitting 10.

Over the top of tubing 12 and the lower end 11 of fitting 10, a flat bag 13 is fitted, which bag is composed of resilient material and contains slits 14 between the two surfaces thereof which may be substantially parallel when the bag is in collapsed condition. The position of the slits 14 in the bag in the embodiment shown is indicated in Figs. 1 and 3.

Thus it will be seen that, when air passes through the hole 15 in fitting 10 and into bag 13, the latter will be caused to swell up, thus opening slits 14 and allowing continuous passage of air through the valve. However, if air pressure is forced through a system containing the valve in the opposite direction, the increased pressure will force the parallel surfaces of bag 13 together, thus closing slits 14 and effectively preventing the passage of air therethrough.

When the valve is closed and the external surfaces of the bag 13 are subjected to high pressure, the rubber tubing or reinforcement 12 effectively prevents the rubber bag 13 from collapsing tightly around the end 11 of fitting 10 and/or being forced into the fitting. Thus the breaking or chafing of the rubber bag 13 by reason of violent engagement against the lower edge of fitting 10 is eliminated. However, the tubing 12 does not affect the sensitivity of the valve in responding to slight pressure changes in the system, even though it does protect the bag 13 from wearing against the edges of fitting 10. This improvement, accordingly, permits the valve to be used for long periods of time without replacement.

Tubing 12 and bag 13 are preferably secured to fitting 10 by stretching them over the end 11 of the fitting 10. However, if desired, they may be cemented or vulcanized in any desired manner. As shown, the bag 13 and member 12 are separate pieces. They may, however, be integral.

By reason of the tapered edges on the end of member 12 which projects into the rubber bag 13, said member 12 will also act somewhat as a valve when squeezed together by high pressures on rubber bag 13 more effectively than if the edges were not tapered.

As has been previously mentioned, this valve has been found particularly useful, and in fact eventuates a novel system not heretofore practicable under the described conditions, when it is used in the pressure tank of automatically or seat-operated toilets as described in U. S. Letters Patent No. 931,939 issued to Patrick J. Madden.

When the seat of an automatically flushing toilet is occupied, a valve is opened which allows water to flow into a so-called pressure tank which fills with water until the air pressure therein is equal to the pressure in the water mains. When the pressure is removed from the seat of the toilet, the valve to the water main is automatically closed and a second valve is opened allowing the water to be forced by the compressed air from the pressure tank to the toilet, thus causing it to be flushed automatically. However, it has been found that under unfortunately rather frequently occurring abnormal conditions the pressure in the water mains may fall to such an extent that it is possible for water to siphon from the toilet bowl back into the water mains. It is therefore desirable that some type of positive and entirely dependable siphon breaker be installed in such an automatically operating system to insure against such occurrence.

Fig. 4 illustrates a system wherein a valve housing 16, containing an inlet valve 17 and an outlet valve 18, is connected to a water supply 19, to a toilet bowl through an outlet 20, and to a pressure tank 21 through a pipe 22. Valve stem 23 of valve 18 is slidingly mounted within the housing 16 in such manner that pressure on a toilet seat 24 will close valve 18 by means of a lever 25 acting against the valve stem 23. Valve stem 26 of valve 17 is also slidingly mounted within housing 16. Valve 17 is so arranged on valve stem 26 that pressure exerted on the toilet seat 24 will be transmitted through valve stem 23 to valve stem 26 and will thus open valve 17.

Valve 27 is connected in the upper portion of the pressure tank 21 in such a manner as to allow air to enter the system but to prevent the escape of air as previously described. The toilet seat 24 is normally held by a spring or other suitable means above the edge of the toilet bowl (not shown). When the seat 24 is depressed against the spring, as indicated in Fig. 4, lever 25 is engaged and forced to the left against valve stem 23, which action in turn causes the left hand end of stem 23 to engage and move valve stem 26 to the left. The valve 18 leading to the outlet 20 to the toilet bowl is thereby closed and valve 17 from the water supply 19 is opened, whereupon water passes from the water supply 19 through valve 17 into the pressure tank 21, and, since the valve 27 prevents air from escaping from the pressure tank, air pressure is built up within the tank equivalent to the water supply pressure.

When the pressure on the seat 24 is released and the latter rises, spring 28 on valve stem 26 closes valve 17 and spring 29 on valve stem 23 opens valve 18 and the water in the tank 21 is forced by the compressed air through valve 18 and outlet 20 to the toilet bowl. In this manner the toilet automatically flushes when the pressure on the seat 24 is released.

It has oftentimes in the past been found that, under a peculiar and not completely understood concordance of circumstances, a vacuum forms in the supply mains delivering water to systems such as the one described here. Under such circumstances, water may siphon from the toilet bowl back into the water mains with consequent contamination of the latter. It is under these conditions that a valve such as is herein illustrated may be most advantageously inserted into the system and be effective in uniformly dependably allowing air to enter the tank 21, thus to eliminate any incipient siphoning effect.

The valve, by the nature of its construction, closes and remains closed when the pressure tank is used for the purpose for which it is intended, but, when, under abnormal conditions, a vacuum is formed in the system by a drop in pressure in the water mains, the valve opens and admits air into the system, which readily prevents any siphoning that may have a tendency to occur.

Accordingly, in a system as just described, it is essential that a valve be provided which will withstand wide variations in pressure without such variations substantially defeating the purpose of the valve itself. The pressure within the tank in such a system generally varies from 20 to 60 pounds per square inch and, under the aforesaid unusual conditions, may vary even more greatly. In short, the limits between which the pressures may vary under abnormal conditions are so excessive that the use of an ordinary type flutter valve in the hereinbefore described system would be—practically speaking—foolhardy; the ordinary valve would be so readily damaged by the aforesaid high pressure variations that no one has heretofore considered such use. However, with a valve of the particular type here described, the system may be arranged as hereinbefore illustrated and the desirable operation thereof insured irrespective of pressure variations; said valve is so constructed that the heretofore unreconcilable requirements have been satisfactorily met. Not only, therefore, is the valve per se of definite value to the art, but likewise the invention thereof has led to a novel and satisfactorily operating system in which said valve is used.

Accordingly, while a particular embodiment of the invention in connection with the valve per se has been heretofore illustrated, it will be understood that the invention is not to be limited to the precise construction shown. Many modifications may be made without departing from the inventive concept herein explained, and it is contemplated, therefore, that the appended claim should be read to cover such modifications as may fall within the true spirit and scope of this invention. Furthermore, while the system shown illustratively to explain the manner in which the valve may be used to permit operations under pressure conditions which have not been heretofore possible, it will be understood that the system is illustrative only and that the claim directed to the valve is intended further to cover any of said modifications wherein the same problems are solved by the use of a valve operable under the most severe pressure ranges.

Having thus fully described the invention, what is claimed as new and is desired to be protected by Letters Patent is:

A valve comprising a substantially flattened resilient bag member having slits at one end and an opening at the other end, a tubular fitting extending through said opening in coaxial relationship to said bag member, and a reinforcing member interposed between said bag member and said fitting, said reinforcing member comprising a tube of resilient material fitted over the end of said fitting, extending into said bag member and projecting beyond said end of the fitting for a substantial distance, the extended end portion of said tube having a tapered edge.

JOHN A. BYERS.